United States Patent
Funaoka et al.

(10) Patent No.: US 9,634,456 B2
(45) Date of Patent: Apr. 25, 2017

(54) GAS LASER OSCILLATION APPARATUS OF ORTHOGONAL EXCITATION TYPE

(71) Applicant: MITSUBISHI ELECTRIC CORPORATION, Tokyo (JP)

(72) Inventors: Kouji Funaoka, Tokyo (JP); Yasunari Matsumoto, Tokyo (JP)

(73) Assignee: MITSUBISHI ELECTRIC CORORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/028,775

(22) PCT Filed: May 27, 2014

(86) PCT No.: PCT/JP2014/063901
§ 371 (c)(1),
(2) Date: Apr. 12, 2016

(87) PCT Pub. No.: WO2015/093076
PCT Pub. Date: Jun. 25, 2015

(65) Prior Publication Data
US 2016/0240992 A1    Aug. 18, 2016

(30) Foreign Application Priority Data
Dec. 17, 2013    (JP) ................. 2013-259816

(51) Int. Cl.
*H01S 3/041*    (2006.01)
*H01S 3/0971*    (2006.01)
(Continued)

(52) U.S. Cl.
CPC ............. *H01S 3/041* (2013.01); *H01S 3/036* (2013.01); *H01S 3/038* (2013.01); *H01S 3/0326* (2013.01);
(Continued)

(58) Field of Classification Search
CPC ........ H01S 3/041; H01S 3/038; H01S 3/0326; H01S 3/036; H01S 3/0971; H01S 3/2232
See application file for complete search history.

(56) References Cited

U.S. PATENT DOCUMENTS 3,875,531 A * 4/1975 Buczek ................. H01S 3/041
                                                         359/346
4,077,018 A * 2/1978 Fahlen ................. H01S 3/0979
                                                         372/38.05
(Continued)

FOREIGN PATENT DOCUMENTS

JP    58-155783 A    9/1983
JP    60-254680 A    12/1985
(Continued)

OTHER PUBLICATIONS

International Search Report (PCT/ISA/210) issued on Sep. 2, 2014, by the Japanese Patent Office as the International Searching Authority for International Application No. PCT/JP2014/063901 (5 pages).

*Primary Examiner* — Dung Nguyen
(74) *Attorney, Agent, or Firm* — Buchanan Ingersoll & Rooney PC (57) ABSTRACT

A gas laser oscillation apparatus of orthogonal excitation type includes an electric discharge region having a pair of electric discharge electrodes, an axial flow blower having a plurality of rotor vanes and working by a permanent magnet motor, a first heat exchanger having a plurality of cooling fins, the cooling fins arranged on a plane perpendicular to an optical axis, a second heat exchanger having a plurality of cooling fins, the cooling fins arranged on a plane perpendicular to the optical axis, a gas duct having a gas passageway and arranged between the electric discharge region and the first heat exchanger, the axial flow blower being arranged on the gas passageway. The axial flow blower is arranged on a windward side of the first heat exchanger. The second heat (Continued)

exchanger is arranged on a windward side of the axial flow blower.

13 Claims, 9 Drawing Sheets

(51) Int. Cl.
*H01S 3/036* (2006.01)
*H01S 3/032* (2006.01)
*H01S 3/038* (2006.01)
H01S 3/07 (2006.01)
H01S 3/223 (2006.01)

(52) U.S. Cl.
CPC ............ *H01S 3/0971* (2013.01); *H01S 3/073* (2013.01); *H01S 3/2232* (2013.01)

(56) References Cited

U.S. PATENT DOCUMENTS

| | | | |
|---|---|---|---|
| 4,734,916 A | 3/1988 | Hoag | |
| 6,914,919 B2 * | 7/2005 | Watson | G03F 7/70025 372/25 |
| 2008/0069157 A1 | 3/2008 | Ariga et al. | |
| 2011/0211601 A1 | 9/2011 | Ariga et al. | |
| 2014/0086270 A1 | 3/2014 | Funaoka et al. | |

FOREIGN PATENT DOCUMENTS

| | | |
|---|---|---|
| JP | 61-284984 A | 12/1986 |
| JP | 61-295603 A | 12/1986 |
| JP | 62-219986 A | 9/1987 |
| JP | 62-235791 A | 10/1987 |
| JP | 63-228690 A | 9/1988 |
| JP | H 03-088378 A | 4/1991 |
| JP | 06-350164 A | 12/1994 |
| JP | 07-283464 A | 10/1995 |
| JP | 08-279637 A | 10/1996 |
| JP | 08-306989 A | 11/1996 |
| JP | 2000-045987 A | 2/2000 |
| JP | 2003-338647 A | 11/2003 |
| JP | 2005-117846 A | 4/2005 |
| JP | 2008-085292 A | 4/2008 |
| JP | 2011-159901 | 8/2011 |
| WO | WO 2012/169036 A1 | 12/2012 |

* cited by examiner

GAS LASER OSCILLATION APPARATUS OF ORTHOGONAL EXCITATION TYPE

FIELD OF THE INVENTION

The present invention relates to a gas laser oscillation apparatus and, more particularly, to the gas laser oscillation apparatus of orthogonal excitation type which encloses a laser medium gas in an oscillator's housing with a sealed structure and generates laser oscillations.

BACKGROUND ART

A gas laser oscillation apparatus of orthogonal excitation type contains an oscillator's housing with a sealed structure in which a laser medium gas such as a CO2 gas is enclosed (see Patent Document 1, for example). Inside of the oscillator's housing, there are provided electric discharge electrodes in use for the discharge excitation of the laser medium gas, a heat exchanger for cooling the laser medium gas, a blower for circulating the laser medium gas and the like. The gas laser oscillation apparatus of orthogonal excitation type functions as a laser amplifier, when windows are attached as substitutes for a total reflection mirror and a partial reflection mirror (see Patent Document 2, for example).

In recent years, Extreme Ultra Violet (EUV) light source devices of Laser Produced Plasma (LPP) type have been developed as light sources corresponding to a next generation exposure machine (see Patent Document 3, for example). CO2 gas laser oscillation apparatuses used for the driver light sources are in need of high power output and downsizing. As for laser oscillators used for laser processing and the like, the increase of the power output has become an issue for the improvement of processing ability (see Patent Documents 4-11, for example).

PRIOR ART REFERENCE

Patent Document

Patent Document 1: JP S60-254680 A
Patent Document 2: JP 2011-159901 A
Patent Document 3: JP 2008-85292 A
Patent Document 4: JP H07-283464 A
Patent Document 5: JP 2003-338647 A
Patent Document 6: JP H06-350164 A
Patent Document 7: JP S62-219986 A
Patent Document 8: JP H08-279637 A
Patent Document 9: JP 2005-117846 A
Patent Document 10: JP 2000-045987 A
Patent Document 11: JP H08-306989 A

SUMMARY OF THE INVENTION

Problems to be Solved by the Invention

When a large amount of electricity is provided to obtain a higher laser output, the temperature of a laser gas having passed through an electric discharge region will rise. Accordingly, efficiency in oscillation decreases and the high power output cannot be obtained. When the electric discharge region is made longer in length along an optical axis direction, aiming for a higher power input without rising the temperature of the laser gas, an oscillator grows in size and the area for installing the apparatus increases. Further, longer electrodes and housing (a vacuum chamber) result in the increase in cost and a longer optical path reduces the stability of optical axis. Those disadvantages are prominent. This invention is intended to solve issues described above. It is our purpose to obtain the gas laser oscillation apparatus of a high power output in a small size, by raising the cooling capacity of the laser medium gas.

Means For Solving the Problems

A gas laser oscillation apparatus of orthogonal excitation type in accordance with the present application includes; an electric discharge region having a pair of electric discharge electrodes, an axial flow blower having a plurality of rotor vanes and working by a permanent magnet motor, a first heat exchanger having a plurality of cooling fins, the cooling fins arranged on a plane perpendicular to an optical axis, a second heat exchanger having a plurality of cooling fins, the cooling fins arranged on a plane perpendicular to the optical axis, a gas duct having a gas passageway and arranged between the electric discharge region and the first heat exchanger, the axial flow blower being arranged on the gas passageway. The axial flow blower is arranged on a windward side of the first heat exchanger.

Effects of the Invention

By using the axial flow blower which has rotor vanes in multi-stages and adopts a permanent magnet motor, air flow is increased in quantity and heat exchangers arranged behind the axial flow blower lower the rise in temperature of the laser gas. As a result, a large quantity of cold laser medium gas can be supplied to the electric discharge region, and the gas laser oscillation apparatus of orthogonal excitation type with high power output and of small in size is provided.

BEST MODE FOR CARRYING OUT THE INVENTION

Hereinafter, Embodiments of a gas laser oscillation apparatus of orthogonal excitation type according to the present invention will be explained in detail with reference to the drawings. The present invention is not limited to the following descriptions but can appropriately be modified within a scope that does not deviate from its spirits. In the drawings, the constituent elements with the same reference characters denote the same or equivalent constituent elements.

Embodiment 1

Figure 1:
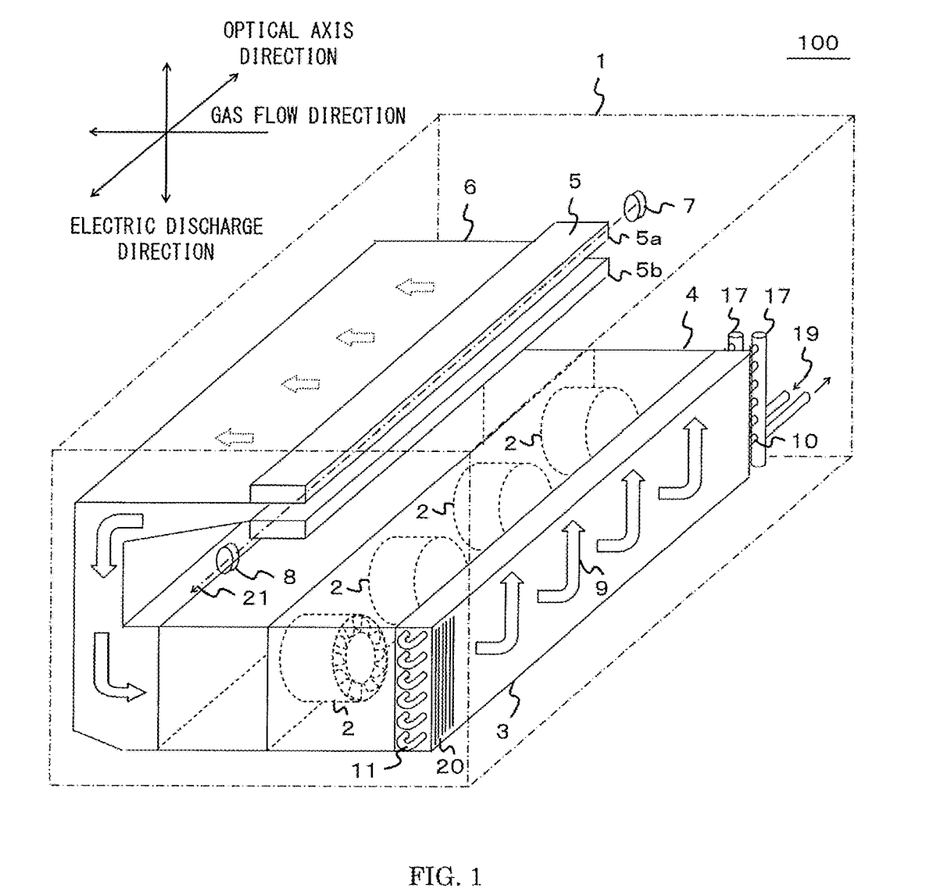
FIG. 1 is a perspective view for showing a gas laser oscillation apparatus in accordance with Embodiment 1 of the present invention.

FIG. 1 is a perspective view which shows a gas laser oscillation apparatus of orthogonal excitation type in accordance with Embodiment 1 of the present invention. A gas laser oscillation apparatus 100 consists of a housing (a vacuum chamber) 1, axial flow blowers 2, a heat exchanger 3, a blow-off side gas duct 4, an electric discharge region 5, a suction side gas duct 6, a total reflection mirror 7, a partial reflection mirror 8 and the like. The electric discharge region 5 for generating laser beams is made up of an electric discharge electrode 5a, an electric discharge electrode 5b and the like, and is arranged inside of the housing 1. The heat exchanger 3 cools a laser medium gas 9. The total reflection mirror 7 and the partial reflection mirror 8 are provided on either side of the housing 1 along the direction of an optical axis and constitute an optical resonator. A laser 21 is emitted from the partial reflection mirror 8. The gas laser oscillation apparatus 100 functions as a laser amplifier, when windows are attached in substitution for the total reflection mirror 7 and the partial reflection mirror 8. Here, the laser medium gas 9 is circulated through the inside of the housing 1 by four axial flow blowers 2.

The suction side gas duct 6 is connected to the blow-off side gas duct 4, so that the laser medium gas 9 circulates and they form a gas passageway between the electric discharge region 5 and the heat exchanger 3. The laser medium gas 9 moves from the electric discharge region 5 to the heat exchanger 3, through the gas passageway of the unified gas ducts. The heat exchanger 3 is made up of pipes 10, U bend pipes 11, header pipes 17, cooling fins 20 and the like. The cooling fins 20 of the heat exchanger 3 are arranged on a plane orthogonal to an optical axis. This is because the laser medium gas 9 flows over a plane perpendicular to the optical axis. The pipes 10 are inserted into the cooling fins 20 perpendicularly (in the direction of an optical axis). The cooling fins 20 are cooled by running coolant water 19 through the pipes 10. A plurality of pipes 10 in unity are connected to a single header pipe 17. The turn-back portion of a pipe 10 is constituted of the U bend pipe 11. Two header pipes 17 are provided, one for a refrigerant supply inlet and the other for a refrigerant exhaust outlet. In the embodiment, the heat exchanger 3 is arranged in a direction parallel to an electric discharge direction. However, it should be noted that if the pipes 10 are arranged parallel to an optical axis 10 and the fins 20 are arranged perpendicular to the optical axis, the heat exchangers 3 may be arranged obliquely.

Figure 2:
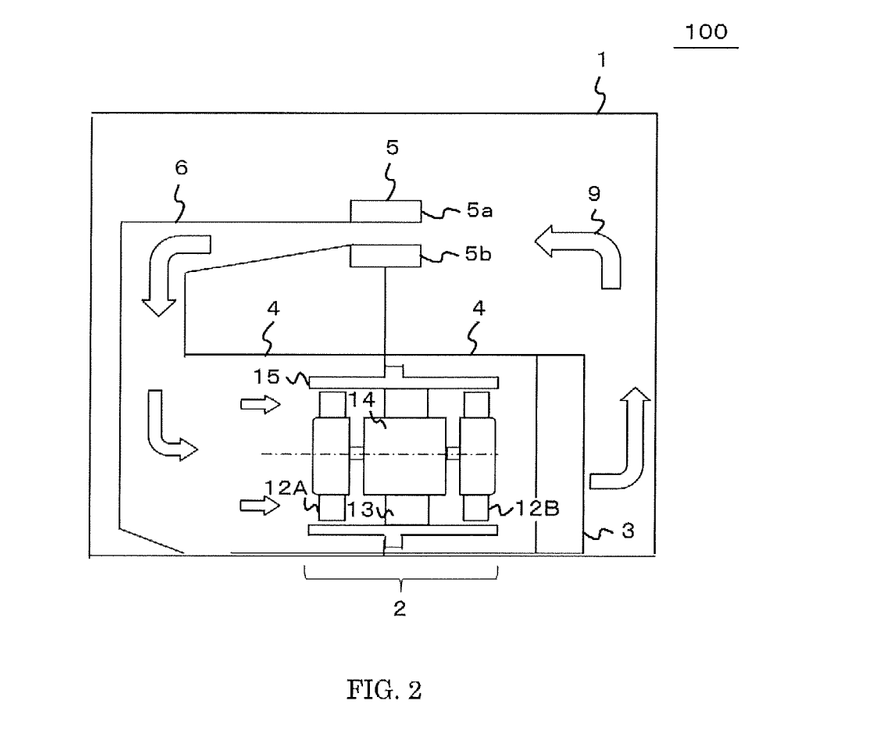
FIG. 2 is a cross-sectional view for showing the gas laser oscillation apparatus in accordance with Embodiment 1 of the present invention.

FIG. 2 is an illustration which shows the cross-sectional view of the gas laser oscillation apparatus in accordance with Embodiment 1. The gas laser oscillation apparatus 100 represents a laser oscillation device of the orthogonal excitation type where an optical axis direction, an electric discharge direction and a gas flow direction are arranged at right angles. The device of orthogonal excitation type supplies the laser medium gas 9 from the vertical direction of the optical axis. Then, the laser gas flow path is large in cross section and a pressure loss is small. As a result, the laser medium gas 9 can be supplied to the electric discharge region 5 in large quantities and the device has an advantage in that laser gas temperature can be kept low. A high frequency voltage is applied between the electric discharge electrode 5a and the electric discharge electrode 5b. The blow-off side gas duct 4 and the suction-side gas duct 6 are arranged between the electric discharge region 5 and the heat exchanger 3.

An axial flow blower 2 is made up of a rotor vane 12A, a rotor vane 12B, a stationary vane 13, a motor 14, a casing 15 and the like. The axial flow blower 2 is a double-stage type device having two rotor vanes and gas flows through in the direction of a rotating shaft linearly. The motor 14 adopts a Permanent Magnet Motor (PMM). The rotor vane 12A and the rotor vane 12B are mounted on the both ends of a motor shaft. A Permanent Magnet Motor applies strong permanent magnets to a rotor, unlike an Induction Motor (IM). The Permanent Magnet Motor has a higher torque and a larger rotational velocity than an Induction Motor. In the axial flow blower 2, the laser medium gas 9 flows through around the motor 14. The motor 14 is supported by and fixed to the casing 15, by the thin stationary vane 13 and other minimum members with least flow disturbance.

Our experiments show that in a case where a blower uses an induction motor or a rotor vane is a single-stage type, the blower slightly heats up. Then, large-sized and costly heat exchangers need not be placed behind the blower. Heat exchangers are predominantly arranged only in the front side of the blower so that the motor of the blower does not become high in temperature. An axial flow blower is said to have a small wind pressure. However, when the axial flow blower is a multi-stage type with rotor vanes and adopts a permanent magnet motor with strong magnets used in a rotor, we understand that compression heat is at a level high enough to affect the laser output. Therefore, the heat exchanger 3 is provided behind the axial flow blower 2 in the Embodiment.

As for the axial flow blower 2, gas flows through around the motor 14 and the blower has a structure where the laser medium gas 9 hits the motor directly. Moreover, the stationary vane 13 fixing the motor 14 is thin, and thermal conduction to the casing 15 is low. The laser medium gas 9 accepts heat easily from the high output power motor and contributes to raise the temperature of the axial flow blower. Furthermore, the heat transfer rate from the motor 14 to the laser medium gas 9 rises with the increase of gas flow speed and the rise contributes to raise the laser gas temperature. When the laser medium gas 9 with a higher temperature by an axial flow blower flows down to the electric discharge region 5, a laser gas temperature becomes higher at the electric discharge region 5 where lasers 21 are generated. If the laser gas is high in temperature, the oscillation efficiency of lasers decreases and the laser at a high output power cannot be provided.

The laser medium gas 9 passes through the heat exchanger 3 before entering the electric discharge region 5 and the heat up portion of the gas by the axial flow blower is refrigerated. Accordingly, a cooled laser medium gas is supplied to the electric discharge region 5. In accordance with the present invention, air flow is increased by employing the axial flow blower which adopts a permanent magnet motor of multi-stage type. The laser gas with a higher temperature by the high output power axial flow blower is cooled down by the heat exchanger 3 which is placed at the exit of the blower. Thus, the rise of the gas temperature by the high output power axial flow blower was lowered. As a result, a large quantity of the cold laser medium gas can be supplied to the electric discharge region 5. The electric input power to the electric discharge region can be increased and a small sized laser oscillation apparatus with a high output power is provided.

The motor 14 of the axial flow blower 2 may adopts an Interior Permanent Magnet (IPM) motor of magnet embedded type. The IPM motor is a synchronous motor of a rotational magnetic field system type and has a structure where permanent magnets are embedded inside a rotor made from silicon steel sheets and the like. Permanent magnets are not thrown out by centrifugal forces during the rotations of the motor, and mechanical stability of the motor is high. IPM motors use reluctance torque and then are known to rotate at a high speed with a high torque. Air flow can be increased by adopting the IPM motor to the axial flow blower 2. The Increase of compression heat is lowered by the heat exchanger 3 arranged behind the axial flow blower, and as a result, a laser apparatus with high cooling capacity is provided.

Embodiment 2

Figure 3:
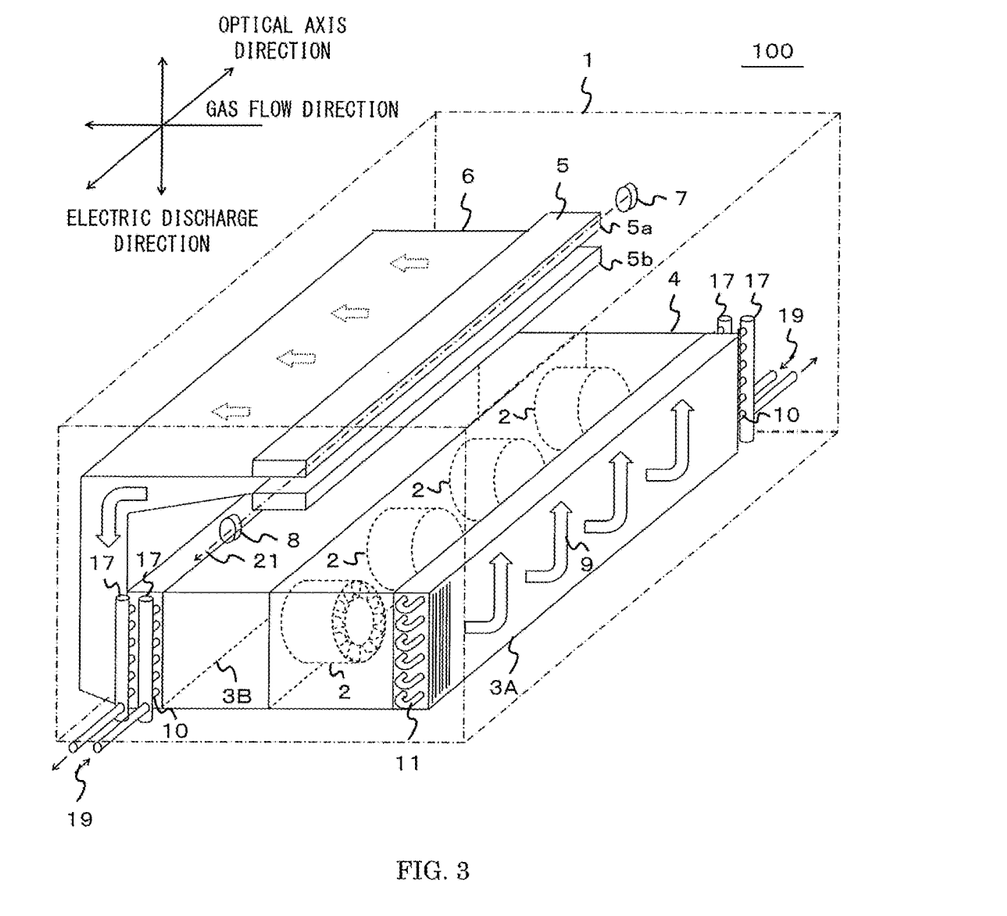
FIG. 3 is a perspective view for showing a gas laser oscillation apparatus in accordance with Embodiment 2 of the present invention.
Figure 4:
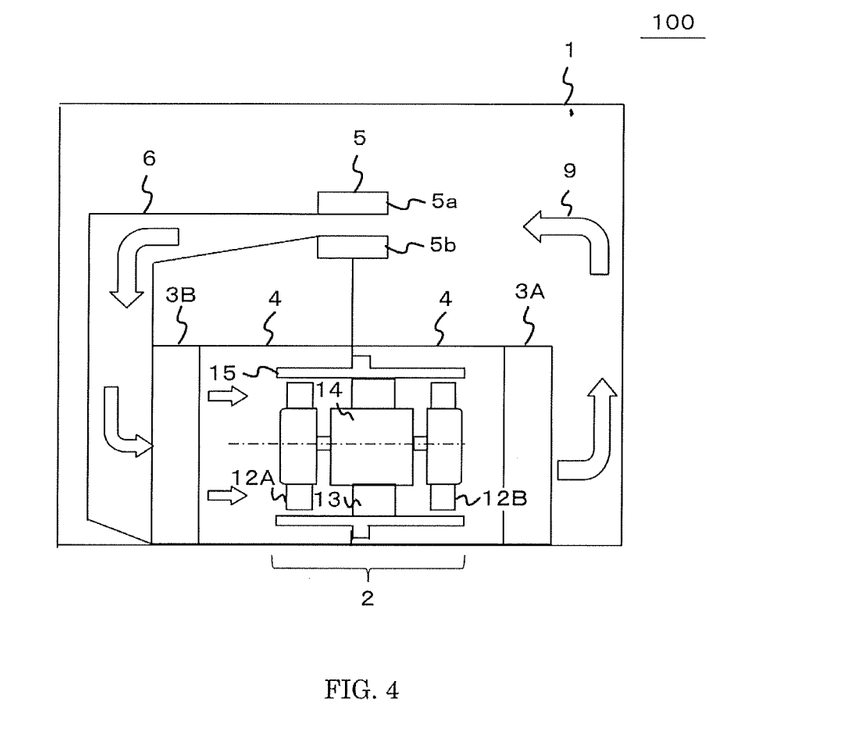
FIG. 4 is a cross-sectional view for showing the gas laser oscillation apparatus in accordance with Embodiment 2 of the present invention.

FIG. 3 is a perspective view which shows a gas laser oscillation apparatus in accordance with Embodiment 2 of the present invention. FIG. 4 is a cross-sectional view which shows the gas laser oscillation apparatus in accordance with Embodiment 2 of the present invention. While the heat exchanger 3 was arranged behind the axial flow blower 2 in Embodiment 1, a heat exchanger 3B and a heat exchanger 3A are, respectively, arranged in front of (on the windward side of) and in the rear of (on the leeward side of) the axial flow blower 2 according to the present Embodiment. The laser medium gas which becomes high in temperature at the electric discharge region 5 is cooled by the heat exchanger 3B. Thus, the laser medium gas 9, hitting the motor 14, can be kept low in temperature and bearings and the like are given a longer life.

Embodiment 3

Figure 5:
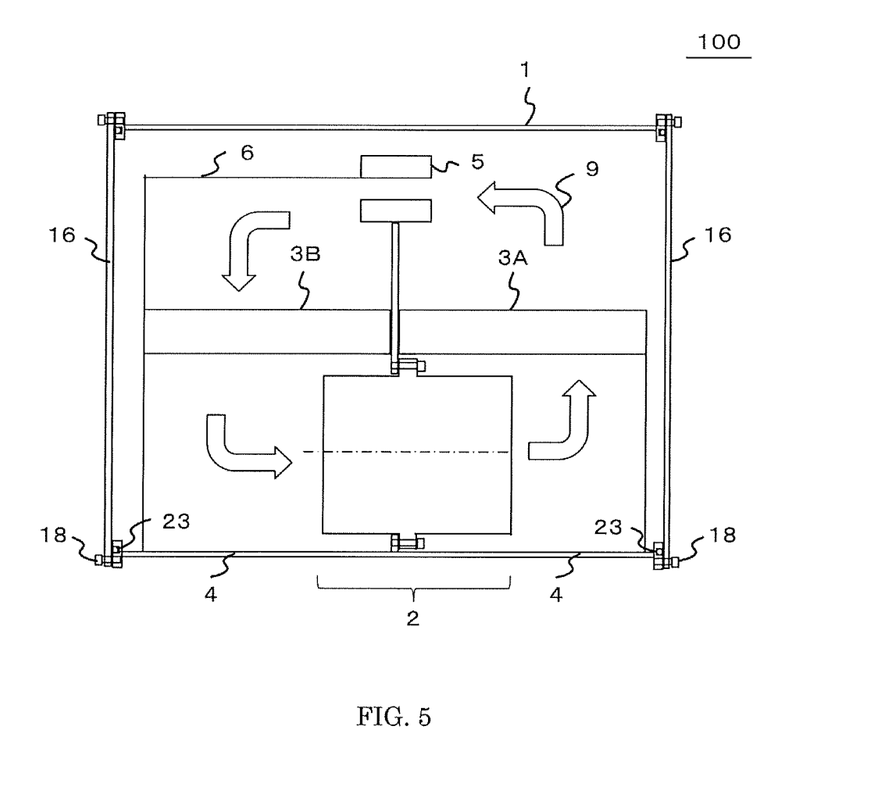
FIG. 5 is a cross-sectional view for showing a gas laser oscillation apparatus in accordance with Embodiment 3 of the present invention.

FIG. 5 is a cross-sectional view which shows a gas laser oscillation apparatus in accordance with Embodiment 3 of the present invention. Embodiment 3 is different from Embodiment 2 in that the heat exchanger 3A and the heat exchanger 3B are arranged in a direction perpendicular to an electric discharge direction. As for the gas laser oscillation apparatus 100, it is necessary to maintain the electric discharge region 5, the heat exchanger 3, the axial flow blower 2 and the like. In a structure where the axial flow blower 2 is disposed between the heat exchangers, it is difficult to maintain the axial flow blower 2 without detaching the heat exchangers from the apparatus.

The heat exchanger 3A and the heat exchanger 3B are arranged in a direction perpendicular to an electric discharge direction. Covers 16 of the housing 1 are fixed to the frame of the housing 1, by using fixing bolts 18 and O rings 23. If the cover 16 of the housing 1 is detached and the blow-off side gas duct 4 is unloaded, instead of unloading the heat exchangers, the axial flow blower 2 can be taken off in a direction perpendicular to the electric discharge direction. The axial flow blower 2 is easy to maintain. Further, the heat exchanger 3A and the heat exchanger 3B may be united. In this case, plumbing work can be reduced at a low cost.

Embodiment 4

Figure 6:
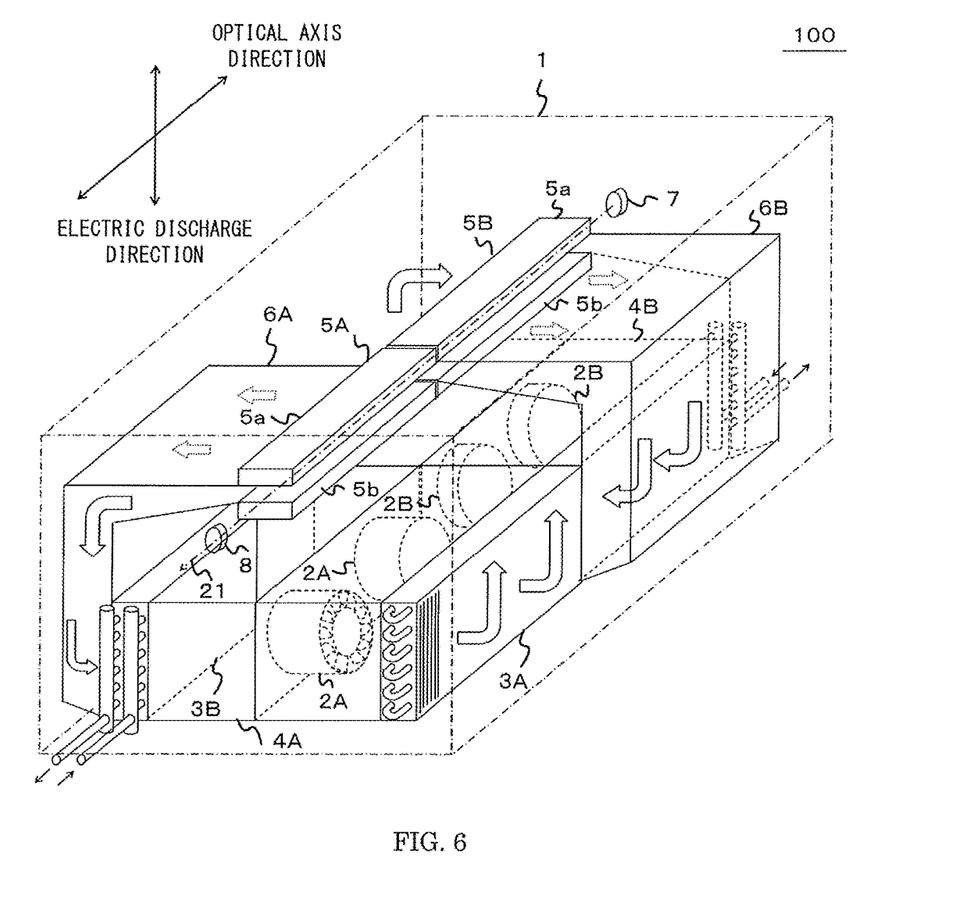
FIG. 6 is a perspective view for showing a gas laser oscillation apparatus in accordance with Embodiment 4 of the present invention.

FIG. 6 is an illustration which shows a gas laser oscillation apparatus in accordance with Embodiment 4 of the present invention. Herein, respectively provided are two sets of electric discharge regions, axial flow blowers and gas ducts. Among others, an electric discharge region 5A and an electric discharge region 5B are arranged in the direction of an optical axis. The electric discharge region 5A and the electric discharge region 5B have approximately half the length of the housing 1 in the direction of the optical axis. A suction side gas duct 6A and a blow-off side gas duct 4A are built in the electric discharge region 5A, and two axial flow blowers 2A are disposed. The axial flow blower 2A and the axial flow blower 2B are arranged so that their air flow directions are to face. Such blowers of the counter flow type are effective in improving the axial symmetry in the beam profiles of orthogonal excitation type oscillators, and, particularly, are employed essentially in high output power gas laser oscillation apparatuses.

Figure 7:
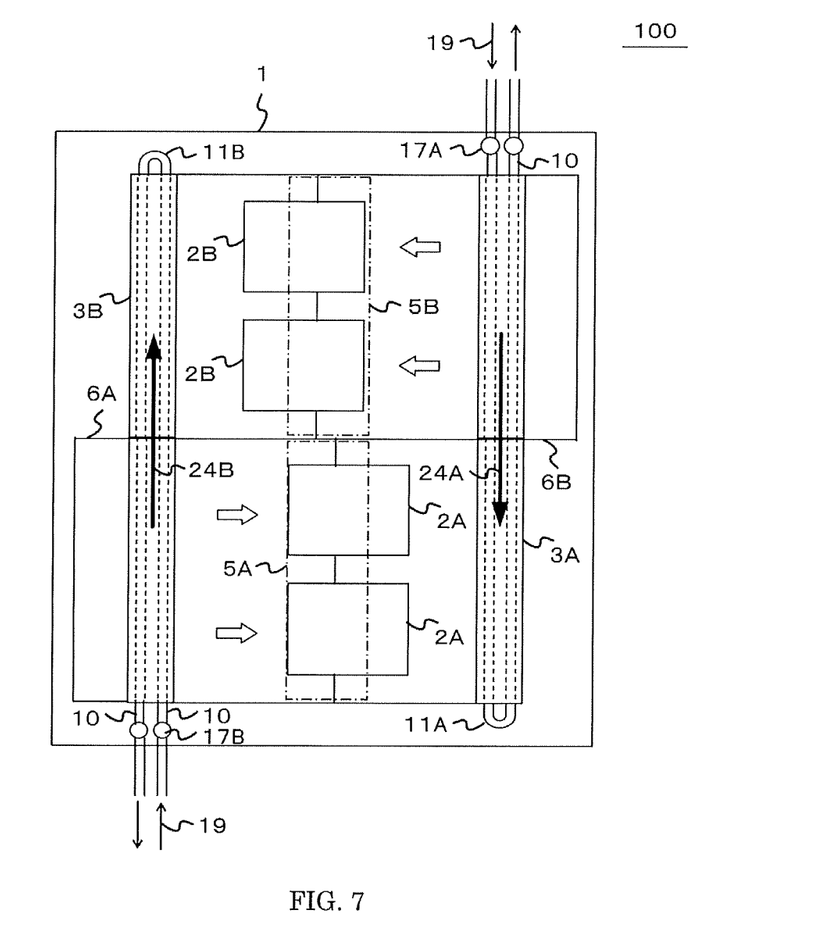
FIG. 7 is a cross-sectional view for showing the gas laser oscillation apparatus in accordance with Embodiment 4 of the present invention.

FIG. 7 is a plan view showing the gas laser oscillation apparatus 100. In the gas laser oscillation apparatus of orthogonal excitation type where gas flow paths are opposing, heat exchangers are arranged in front of and in the rear of the axial flow blower. The heat exchanger in front of the blower and the heat exchanger in the rear of the blower are integrated. In the drawing, an arrow 24A represents a direction toward a U bend pipe 11A from a header pipe 17A. An arrow 24B represents a direction toward a U bend pipe 11B from a header pipe 17B. Herein, the direction toward the U bend pipe 11A from the header pipe 17A is opposite to the direction toward the U bend pipe 11B from the header pipe 17B.

The gas duct of the electric discharge region 5A includes, on the gas passageway, the heat exchanger 3B on the windward side of the axial flow blower 2A. Also, the gas duct of the electric discharge region 5B includes, on the gas passageway, the heat exchanger 3A on the windward side of the axial flow blower 2B. The heat exchanger 3A and the heat exchanger 3B need pipe arrangement for supplying cold water. Particularly, header pipes 17 are high in cost, because brazing of pipes 10 are performed one by one with manual labors. In contrast, pipe sharing in the heat exchangers allows the number of pipes to reduced, in a case where the heat exchangers are integrated. Further, because the U bend pipes 11 for coolant turning back can be reduced in number, the increase in cost by adding heat exchangers behind the blower can be minimized.

The electric discharge region 5B shares an optical axis with the electric discharge region 5A, and spacing exists between the both regions. Because laser medium gas does not flow in the spacing, formed is a non-excitation portion where electric discharges are not generated. In the non-excitation portion, laser beams are absorbed by the laser medium gas, and the laser output decreases. The integration of the heat exchangers excludes interference of the U bend pipes in accordance with the present Embodiment. Thus, the spacing between the electric discharge region 5A and the electric discharge region 5A can be minimized. A reduced non-excitation portion generates lasers of higher output power. The absorption of laser beams in the non-excitation portion becomes higher with the increase of laser beam intensity. The Embodiment is particularly effective in the case of an amplifier for EUV through which laser beams of some 10 kWs pass.

Embodiment 5

Figure 8:
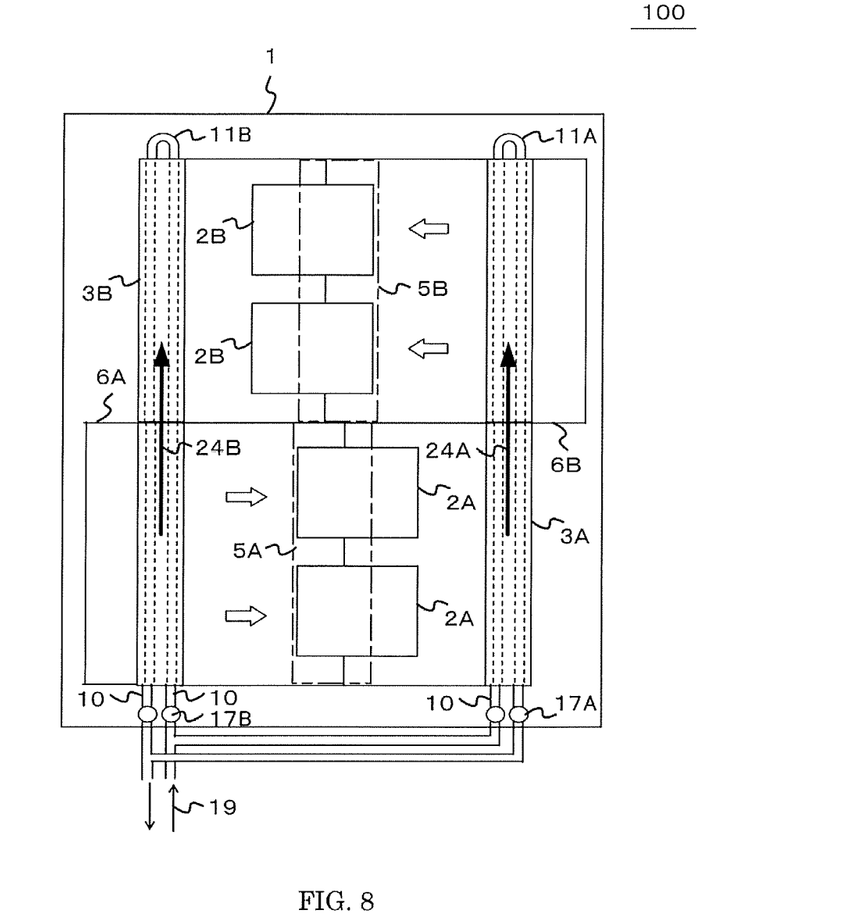
FIG. 8 is a cross-sectional view for showing a gas laser oscillation apparatus in accordance with Embodiment 5 of the present invention.

While header pipes 17 of coolant water (a refrigerant supply inlet and a refrigerant exhaust outlet) are arranged on different sides of the heat exchangers along a direction of an optical axis according to Embodiment 4, those pipes may be arranged on the same side, as shown in FIG. 8. In the drawing, an arrow 24A represents a direction toward a U bend pipe 11A from a header pipe 17A. An arrow 24B represents a direction toward a U bend pipe 11B from a header pipe 17B. The arrow 24A and the arrow 24B head for the same direction. The header pipes 17A and the header pipes 17B are aligned in one direction. Then, the plumbing work can be made at a minimum length. The heat exchangers can be made at a low cost and, at the same time, are easy to assemble.

Embodiment 6

Figure 9:
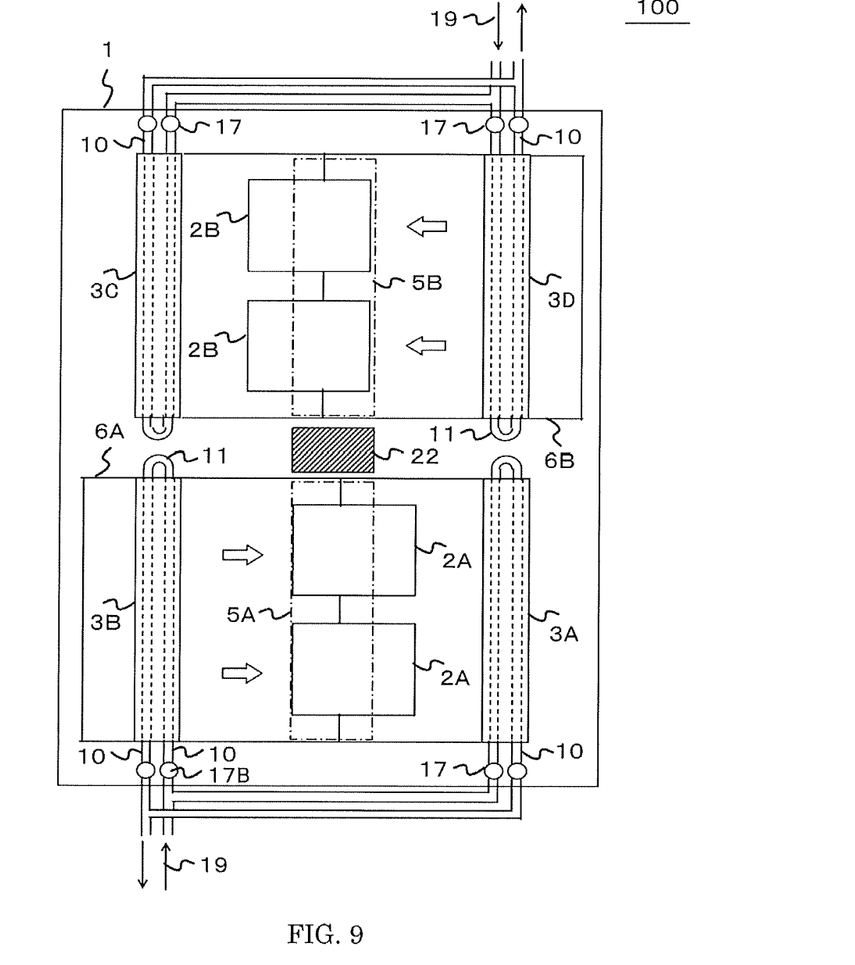
FIG. 9 is a cross-sectional view for showing a gas laser oscillation apparatus in accordance with Embodiment 6 of the present invention.

FIG. 9 is an illustration for showing a case where heat exchangers are not integrated. The gas laser oscillation apparatus 100 consists of a heat exchanger 3A, a heat exchanger 3B, a heat exchanger 3C and a heat exchanger 3D. The heat exchanger 3B is arranged on the windward side of the axial flow blower 2A. The heat exchanger 3D is arranged on the windward side of the axial flow blower 2B. Spacing is necessary between the suction side gas duct 6A and the suction side gas duct 6B, due to the mechanical interference of the U bend pipes 11. Because laser medium gas does not flow in the spacing, formed is a non-excitation portion 22 where electric discharges are not generated. Laser beams are absorbed by the laser medium gas in the non-excitation portion, and then the output power of the laser is reduced. The absorption of laser beams at the non-excitation portion becomes higher with the increase of laser beam intensity. The present embodiment is suitable for the gas laser oscillation apparatus with small output power.

In the scope of the present invention, the embodiments thereof can freely be combined with one another and can appropriately be modified or omitted.

EXPLANATION OF NUMERALS AND SYMBOLS 1 housing; 2 axial flow blower; 2A axial flow blower; 2B axial flow blower; 3 heat exchanger; 3A heat exchanger; 3B heat exchanger; 3C heat exchanger; 3D heat exchanger; 4 blow-off side gas ducts; 4A blow-offside gas duct; 4B blow-off side gas duct; 5 electric discharges region; 5a electric discharge electrode; 5b electric discharge electrode; 5A electric discharge region; 5B electric discharge region; 6 suction side gas ducts; 6A suction side gas duct; 6B suction side gas duct; 7 total reflection mirror; 8 partial reflection mirror; 9 laser medium gas; 10 pipe; 11 U bend pipe; a 12A rotor vane; 12B rotor vane; 13 stationary vane; 14 motor; 15 casing; 16 cover; 17 header pipe; 18 fixing bolt; 19 coolant water; 20 cooling fin; 21 laser; 22 non-excitation region; 23 O ring; 24A arrow; 24B arrow; 100 gas laser oscillation apparatus

What is claimed is:
1. A gas laser oscillation apparatus of orthogonal excitation type,
the apparatus comprising;
an electric discharge region having a pair of electric discharge electrodes,
an axial flow blower having a stationary vane disposed between two rotor vanes and working by a motor, the motor fixed to a casing by the stationary vane,
a first heat exchanger having a plurality of cooling fins, the cooling fins arranged on a plane perpendicular to an optical axis,
a gas duct having a gas passageway and arranged between the electric discharge region and the first heat exchanger, the axial flow blower being arranged on the gas passageway,
wherein the axial flow blower is arranged on a windward side of the first heat exchanger.
2. The gas laser oscillation apparatus of orthogonal excitation type as set forth in claim 1,
the apparatus further comprising;
a second heat exchanger having a plurality of cooling fins, the fins arranged on a plane perpendicular to an optical axis,
wherein the second heat exchanger is arranged on a windward side of the axial flow blower.
3. The gas laser oscillation apparatus of orthogonal excitation type as set forth in claim 2,
wherein the first heat exchanger and the second heat exchanger are arranged in a direction parallel to an electric discharge direction of the electric discharge region.
4. The gas laser oscillation apparatus of orthogonal excitation type as set forth in claim 2,
wherein the first heat exchanger and the second heat exchanger are arranged in a direction perpendicular to an electric discharge direction of the electric discharge region.
5. The gas laser oscillation apparatus of orthogonal excitation type as set forth in claim 1,
wherein the motor has permanent magnets embedded in a rotor.
6. A gas laser oscillation apparatus of orthogonal excitation type,
the apparatus comprising;
a first electric discharge region having a pair of electric discharge electrodes,
a second electric discharge region having a pair of electric discharge electrodes and sharing an optical axis with the first electric discharge region,
a first axial flow blower having a first stationary vane disposed between two rotor vanes and working by a first motor, the first motor fixed to a casino by the first stationary vane,
a second axial flow blower having a second stationary vane disposed between two rotor vanes and working by a second motor, the second motor fixed to a casino by the second stationary vane,
a first heat exchanger having a plurality of cooling fins, the cooling fins arranged on a plane perpendicular to the optical axis,
a second heat exchanger having a plurality of cooling fins, the cooling fins arranged on a plane perpendicular to the optical axis,
a first gas duct having a first gas passageway and arranged between the first electric discharge region and the first heat exchanger, the first axial flow blower being arranged on the first gas passageway,
a second gas duct having a second gas passageway and arranged between the second electric discharge region and the second heat exchanger, the second axial flow blower being arranged on the second gas passageway,
wherein the first gas duct includes, on the first gas passageway, the second heat exchanger on a windward side of the first axial flow blower and;
the second gas duct includes, on the second gas passageway, the first heat exchanger on a windward side of the second axial flow blower.

7. The gas laser oscillation apparatus of orthogonal excitation type as set forth in claim 6,
wherein the first heat exchanger has a first header pipe and a first bend pipe at both ends of the exchanger;
the second heat exchanger has a second header pipe and a second bend pipe at both ends of the exchanger; and
a direction toward the first bend pipe from the first header pipe is opposing to a direction toward the second bend pipe from the second header pipe.

8. The gas laser oscillation apparatus of orthogonal excitation type as set forth in claim 6,
wherein the first heat exchanger has a first header pipe and a first bend pipe at both ends of the exchanger;
the second heat exchanger has a second header pipe and a second bend pipe at both ends of the exchanger; and
a direction toward the first bend pipe from the first header pipe is the same with a direction toward the second bend pipe from the second header pipe.

9. A gas laser oscillation apparatus of orthogonal excitation type,
the apparatus comprising;
a first electric discharge region having a pair of electric discharge electrodes,
a second electric discharge region having a pair of electric discharge electrodes and sharing an optical axis with the first electric discharge region,
a first axial flow blower having a first stationary vane disposed between two rotor vanes and working by a first motor, the first motor fixed to a casing by the first stationary vane,
a second axial flow blower having a second stationary vane disposed between two rotor vanes and working by a second motor, the second motor fixed to a casing by the second stationary vane,
a first heat exchanger having a plurality of cooling fins, the cooling fins arranged on a plane perpendicular to the optical axis,
a second heat exchanger having a plurality of cooling fins, the cooling fins arranged on a plane perpendicular to the optical axis,
a third heat exchanger having a plurality of cooling fins, the cooling fins arranged on a plane perpendicular to the optical axis,
a fourth heat exchanger having a plurality of cooling fins, the cooling fins arranged on a plane perpendicular to the optical axis,
a first gas duct having a first gas passageway and arranged between the first electric discharge region and the first heat exchanger, the first axial flow blower and the second heat exchanger being arranged on the first gas passageway,
a second gas duct having a second gas passageway and arranged between the second electric discharge region and the second heat exchanger, the second axial flow blower and the fourth heat exchanger being arranged on the second gas passageway,
wherein the second heat exchanger is arranged on a windward side of the first axial flow blower; and
the fourth heat exchanger is arranged on a windward side of the second axial flow blower.

10. The gas laser oscillation apparatus of orthogonal excitation type as set forth in claim 1,
wherein the first heat exchanger has a pipe inserted perpendicularly to the plurality of cooling fins, the pipe through which coolant is supplied, and
the first heat exchanger is arranged in a direction parallel to the two rotor vanes of the axial flow blower.

11. The gas laser oscillation apparatus of orthogonal excitation type as set forth in claim 2,
wherein the motor has permanent magnets embedded in a rotor.

12. The gas laser oscillation apparatus of orthogonal excitation type as set forth in claim 3,
wherein the motor has permanent magnets embedded in a rotor.

13. The gas laser oscillation apparatus of orthogonal excitation type as set forth in claim 4,
wherein the motor has permanent magnets embedded in a rotor.

* * * * *